E. T. BULLOCK.
HEDGE TRIMMING MACHINE.
APPLICATION FILED DEC. 20, 1910.
1,039,021.
Patented Sept. 17, 1912.
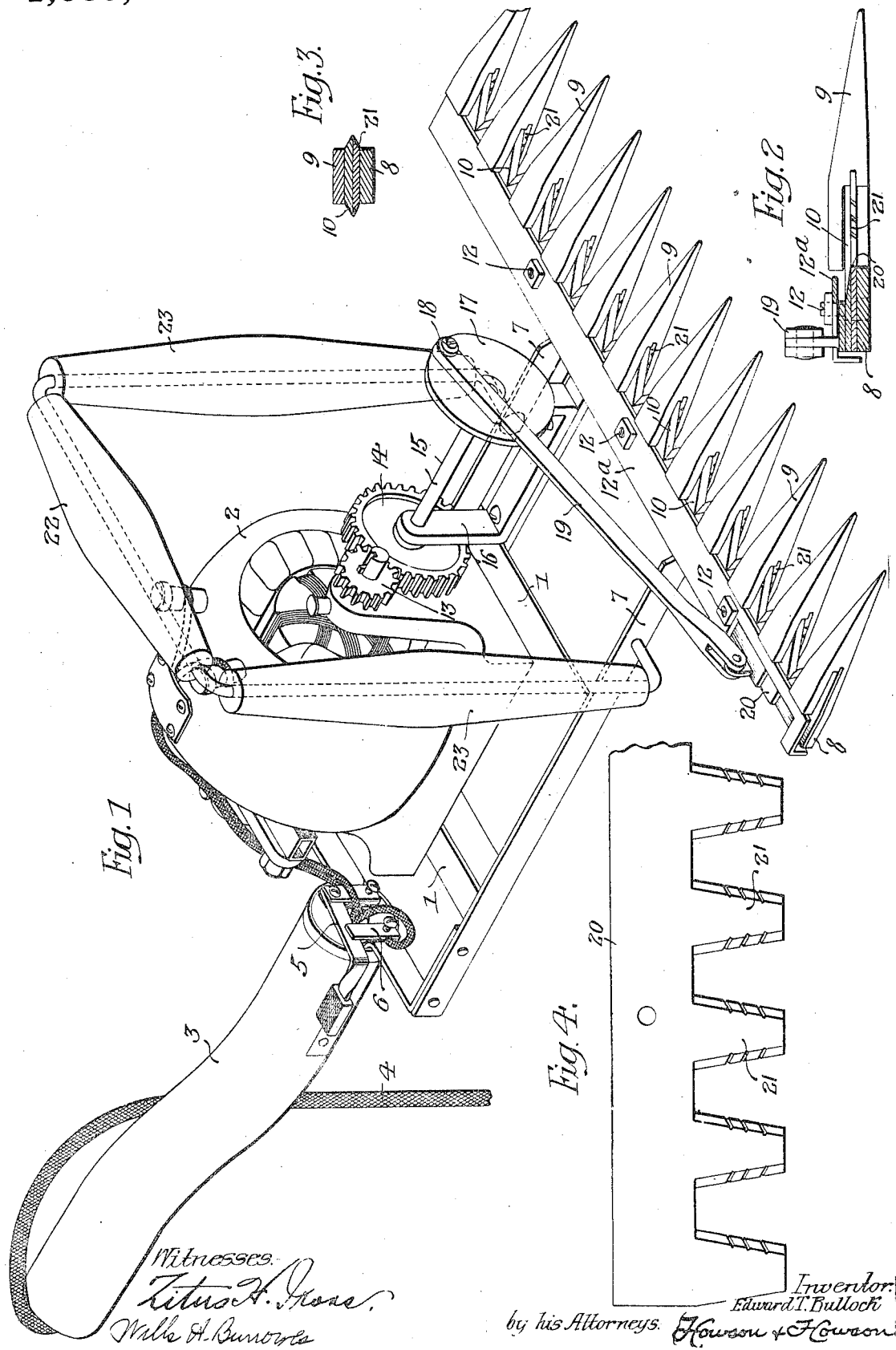
Witnesses:
Inventor:
Edward T. Bullock
by his Attorneys.

UNITED STATES PATENT OFFICE.

EDWARD T. BULLOCK, OF RIDLEY PARK, PENNSYLVANIA, ASSIGNOR OF ONE-THIRD TO E. W. TWADDELL, OF DEVON, PENNSYLVANIA.

HEDGE-TRIMMING MACHINE.

1,039,021. Specification of Letters Patent. Patented Sept. 17, 1912.

Application filed December 20, 1910. Serial No. 598,333.

*To all whom it may concern:*

Be it known that I, EDWARD T. BULLOCK, a citizen of the United States, and a resident of Ridley Park, Delaware county, Pennsylvania, have invented certain Improvements in Hedge-Trimming Machines, of which the following is a specification.

This invention relates to a novel form of cutting machine; one object thereof being to provide a relatively light, power actuated device of simple construction particularly adapted for use in trimming hedges and like work.

This invention is illustrated in the accompanying drawings, in which:—

Figure 1, is a perspective view of the hedge trimmer forming the subject of the invention; Fig. 2, is a vertical section taken transversely of the knife and longitudinally of the guard; Fig. 3, is a vertical section taken transversely of one of the guards, and Fig. 4, is a fragmentary plan of a portion of the auxiliary cutter.

In the above drawings, 1 represents a base or frame on which is mounted a source of power such as an electric motor 2; there being a handle 3 extended rearwardly from the base or frame whereby the apparatus may be supported or carried to a greater or less extent. This handle 3 is preferably curved so that its main portion is elevated above the plane of the base 1, thereby making it possible for the operator to move the machine over a level hedge or other surface without having the hand grasping this handle, come in contact with such surface. The current supply wires 4 of the motor are in this case carried through the handle 3 which has mounted in or upon it a switch whose movable and fixed members are indicated at 5 and 6 respectively. It will be understood, however, that any desired and suitable form of switch may be used to control the current flow to the motor.

Projecting forwardly from the front edge of the base 1 are two bars, of which one is shown at 7, and these have firmly attached to them an elongated finger bar 8 mounted to extend in a line substantially at right angles to the general line of the handle 3. This finger bar 8 is provided with forwardly extending knife guards 9, preferably of the form customarily used in grass mowing machines, and has slidably mounted on it a toothed cutter blade 10 provided with slots for the reception of guide bolts 12 mounted on said finger bar; there being a guard plate 12$^a$ carried by said bolts and covering the back and rear edge of said cutter blade.

The armature shaft of the motor 2 or the main driven shaft of what ever device is employed in place of said motor, has mounted on one end a pinion 13 meshing with a gear 14 carried on a shaft 15, and this latter is supported in suitable bearings on a bracket 16 carried by the base or frame 1; having fixed to its outer end a crank disk 17 whose pin 18 is attached by a connecting rod 19 to the cutter blade 10. In order to facilitate the cutting action of the inclined edges of the cutter or blade 10, there is mounted in or on the top surface of the finger bar or support 8 an auxiliary cutter plate 20 as shown in Fig. 4, having teeth 21 beveled or cut away underneath and provided with notches or serrations in their edges, as shown in Fig. 3, so as to coöperate with the cutter or blade 10, in holding and severing whatever object is inserted between the guard fingers of the finger bar. A second support 22 is pivotally connected to the frame or base 1 between the cutter bar 8 and the motor 2, and its construction is preferably similar to the bail of a kettle or pot, so that it will permit the free swinging of the device on its side members 23; there being handles or grips mounted as shown on the top and side members. Moreover, it is so placed that if it be employed to carry the entire weight of the apparatus, the handle, frame and motor will overbalance the remainder thereof and cause the cutter with its associated parts to be elevated to a greater or less extent.

Under operating conditions, current is supplied to the wires 4 from a storage battery or other suitable source of current and the handle 3 is grasped by one hand of the operator, while the support 22 is held by his other hand. The forcing down of the switch member 5 into engagement with the member 6 permits current to flow to the motor, so that its armature is turned at a high rate of speed and power is transmitted through the pinion 13, gear 14, crank 17 and connecting rod 19 to the cutter blade 10 which is thus rapidly reciprocated upon the finger bar. The device may then easily be guided to bring the hedge, twigs, or branches etc., between the fingers 9 of the finger bar and between the teeth of the cutter, so that these coöperate with the auxiliary knife 21 to sever the same, the serrations in the edges of the teeth of this latter knife serving to prevent said twigs etc., from moving away from the cutter blade after being engaged by the inclined edges thereof.

The various parts of the apparatus are preferably made of aluminum or other extremely light material as far as this is possible so that the apparatus is easily portable and convenient as well as efficient in use. When necessary either or both of the cutters may be removed for the purpose of sharpening.

Claim:

The combination in a hedge trimming machine of a substantially flat frame; a finger bar rigidly fixed to and extending across one end of said frame; a motor mounted on the frame; a gear on the armature shaft of said motor; an intermediate shaft carried by the frame and having a crank; a cutter guided by the finger bar; a connecting rod extending between the cutter and the crank; a handle rigidly fixed to and projecting rearwardly from the back part of the supporting frame; and a second handle pivotally connected to and extending upwardly from that part of the frame between the motor and the finger bar.

In testimony whereof, I have signed my name to this specification, in the presence of two subscribing witnesses.

EDWARD T. BULLOCK.

Witnesses:
WILLIAM E. BRADLEY,
WM. A. BARR.